United States Patent
Pinel et al.

(10) Patent No.: US 11,281,912 B2
(45) Date of Patent: Mar. 22, 2022

(54) ATTRIBUTE CLASSIFIERS FOR IMAGE CLASSIFICATION

(71) Applicant: International Business Machines Corporation, Armonk, NY (US)

(72) Inventors: Florian Pinel, New York, NY (US); Russell Bobbitt, New York, NY (US); Yun Zhai, Pound Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 17/086,227

(22) Filed: Oct. 30, 2020

(65) Prior Publication Data

US 2021/0073548 A1 Mar. 11, 2021

Related U.S. Application Data

(62) Division of application No. 16/243,553, filed on Jan. 9, 2019, now Pat. No. 11,068,718.

(51) Int. Cl.
*G06K 9/00* (2022.01)
*G06K 9/62* (2022.01)

(52) U.S. Cl.
CPC ......... *G06K 9/00718* (2013.01); *G06K 9/628* (2013.01); *G06K 9/6256* (2013.01)

(58) Field of Classification Search
None
See application file for complete search history.

(56) References Cited

U.S. PATENT DOCUMENTS

| 7,437,334 B2 * | 10/2008 | Forman ............... G06Q 10/107 706/12 |
| 8,140,584 B2 | 3/2012 | Guha |
| 8,472,720 B2 | 6/2013 | Nagamatsu |

(Continued)

FOREIGN PATENT DOCUMENTS

| CN | 107833213 A | 3/2018 |
| DE | 10110038 B4 | 10/2005 |

(Continued)

OTHER PUBLICATIONS

Fabian et al., "Searching for People through Textual and Visual Attributes," 2012 25th SIBGRAPI Conference on Graphics, Patterns and Images, 2012, pp. 276-282, doi: 10.1109/SIBGRAPI.2012.45. (Year: 2012).*

(Continued)

*Primary Examiner* — Feng Niu
(74) *Attorney, Agent, or Firm* — Michael A. Petrocelli

(57) ABSTRACT

A method includes activating a first object detector and a second object detector. The first object detector is operable to detect a first type of object in a set of image frames, and the second object detector is operable to detect a second type of object in the set of image frames. The method also includes activating a first set of attribute classifiers and a second set of attribute classifiers. The method also includes generating first statistics for the first object detector and second statistics for the second object detector. The method also includes modifying activation of at least the second set of attribute classifiers based on a comparison of the first statistics and the second statistics.

4 Claims, 7 Drawing Sheets

(56) References Cited

U.S. PATENT DOCUMENTS

| | | | |
|---|---|---|---|
| 8,649,594 B1* | 2/2014 | Hua | G06K 9/00771 |
| | | | 382/159 |
| 8,923,630 B2 | 12/2014 | Guo | |
| 9,208,323 B1* | 12/2015 | Karta | G06F 21/577 |
| 9,292,688 B2* | 3/2016 | Avasarala | G06F 21/56 |
| 9,552,536 B2* | 1/2017 | Ando | G06K 9/4671 |
| 10,540,554 B2 | 1/2020 | Guo | |
| 10,599,998 B2 | 3/2020 | Horie | |
| 10,817,781 B2* | 10/2020 | Skiles | G06N 20/10 |
| 2009/0087027 A1 | 4/2009 | Eaton | |
| 2011/0243376 A1 | 10/2011 | Lüke | |
| 2011/0243386 A1 | 10/2011 | Sofka | |
| 2012/0158620 A1* | 6/2012 | Paquet | G06N 3/08 |
| | | | 706/12 |
| 2013/0268476 A1 | 10/2013 | Sankarasubramniam | |
| 2016/0026900 A1* | 1/2016 | Ando | G06K 9/4642 |
| | | | 382/159 |
| 2017/0178029 A1 | 6/2017 | Horie | |
| 2018/0204067 A1* | 7/2018 | Kazui | G06K 9/00718 |
| 2018/0300535 A1 | 10/2018 | Jain | |
| 2018/0314939 A1* | 11/2018 | Skiles | G06N 3/08 |
| 2019/0130188 A1 | 5/2019 | Zhou | |
| 2019/0259284 A1 | 8/2019 | Krishna | |
| 2019/0294881 A1* | 9/2019 | Polak | G06K 9/4628 |
| 2019/0303686 A1 | 10/2019 | Guo | |
| 2020/0054306 A1 | 2/2020 | Mehanian | |
| 2020/0160538 A1 | 5/2020 | Daniel | |
| 2020/0218900 A1 | 7/2020 | Pinel | |

FOREIGN PATENT DOCUMENTS

| | | |
|---|---|---|
| WO | 2012050252 A1 | 4/2012 |
| WO | 2016160794 A1 | 10/2016 |

OTHER PUBLICATIONS

List of IBM Patents or Patent Applications Treated as Related. Filed Herewith. 2 pages.

Lobo, Savia, "IBM rolls out Deep Learning as a Service (DLaaS) program for AI developers", https://hub.packtpub.com/ibm-rolls-deep-learning-service-dlaas-program-ai-developers/, last modified Mar. 21, 2018, accessed Jun. 16, 2018.

Prest, et al., "Learning Object Class Detectors from Weakly Annotated Video", 2012 IEEE Conference on Computer Vision and Pattern Recognition, pp. 3282-3289.

Suleiman, et al., "A 58.6 mW 30 Frames/s Real-Time Programmable Multiobject Detection Accelerator With Deformable Parts Models on Full HD 1920×1080 Videos", IEEE Journal of Solid-State Circuits, vol. 52, No. 3, Mar. 2017, pp. 844-855.

Wang, et al., "Multi-Object Detection in Traffic Scenes Based on Improved SSD", Nov. 2018, Electronics 7 (11): 302, 28 pages.

Wu, et al., "SqueezeDet: Unified, Small, Low Power Fully Convolutional Neural Networks for Real-Time Object Detection for Autonomous Driving", 2017 IEEE Conference on Computer Vision and Pattern Recognition Workshops, pp. 446-454.

* cited by examiner

ATTRIBUTE CLASSIFIERS FOR IMAGE CLASSIFICATION

BACKGROUND

The present disclosure is related to image classification, and more specifically, to attribute classifiers.

SUMMARY

According to one implementation of the present disclosure, a method includes activating a first object detector and a second object detector. The first object detector is operable to detect a first type of object in a set of image frames, and the second object detector is operable to detect a second type of object in the set of image frames. The method also includes activating a first set of attribute classifiers and a second set of attribute classifiers. The method also includes generating first statistics for the first object detector and second statistics for the second object detector. The method also includes modifying activation of at least the second set of attribute classifiers based on a comparison of the first statistics and the second statistics.

According to another implementation of the present disclosure, an apparatus includes a memory and a controller coupled to the memory. The controller is configured to activate a first object detector and a second object detector. The first object detector is operable to detect a first type of object in a set of image frames associated with video, and the second object detector is operable to detect a second type of object in the set of image frames. The controller is also configured to activate a first set of attribute classifiers and a second set of attribute classifiers. The first set of attribute classifiers is operable to determine different attributes of objects detected by the first object detector and the second set of attribute classifiers is operable to determine different attributes of objects detected by the second object detector. The controller is further configured to generate first statistics for the first object detector and second statistics for the second object detector. The controller is also configured to modify activation of at least the second set of attribute classifiers based on a comparison of the first statistics and the second statistics.

According to another implementation of the present disclosure, a method includes activating, at a controller, an object detector to detect a particular type of object in a set of image frames associated with video. In response to a determination that there are no available attribute classifiers that are operable to determine attributes of objects detected by the object detector, the method includes receiving a user input indicating a particular attribute for the particular type of object. The method also includes generating training data for the particular attribute based on the user input. The method further includes generating a particular attribute classifier based on the training data. The particular attribute classifier is operable to determine the particular attribute for each object detected by the object detector.

DETAILED DESCRIPTION

Figure 1:
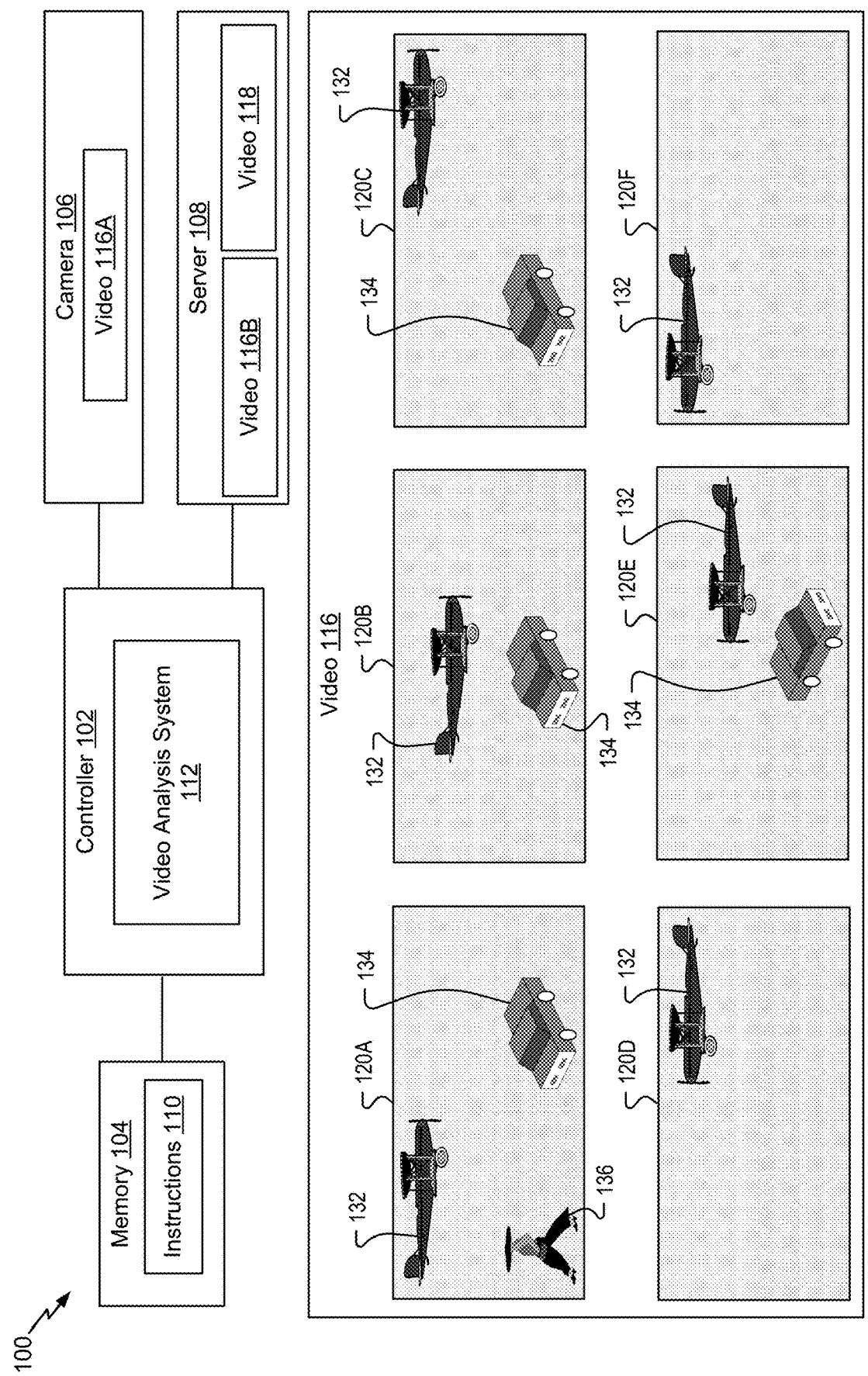
FIG. 1 is a diagram of a system that is operable to modify activation of attribute classifiers and to generate attribute classifiers for image classification.

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple image frames are illustrated and associated with reference numbers 120A, 120B, etc. When referring to a particular one of these image frames, such as the image frame 120A, the distinguishing letter "A" is used. However, when referring to any arbitrary one of these image frames or to these image frames as a group, the reference number 120 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

A video management system can deploy (e.g., activate) object detectors and attribute classifiers to identify and characterize objects in a video. For example, the video management system can deploy an object detector to detect objects within image frames of the video, and the video management system can deploy attribute classifiers to identify attributes (e.g., color, size, shape, etc.) of the detected objects. Typically, different types of attribute classifiers are used to determine attributes of different types of objects. For example, a first attribute classifier can determine a first attribute (e.g., a color) of a first type of object (e.g., a plane), a second attribute classifier can determine a second attribute (e.g., a shape) of the first type of object, a third attribute classifier can determine a third attribute (e.g., the model/brand) of a second type of object (e.g., a car), etc.

One advantage of techniques described herein is conservation of battery and processing resources, such as central processing units (CPUs) and graphics processing units (GPUs). For example, deployment (e.g., activation) of attribute classifiers is modified based on object detection statistics and performance data associated with the attribute classifiers to conserve processing resources and battery power. To illustrate, a controller deactivates attribute classifiers that are operable to determine attributes of a particular object if the particular object is not detected by object detectors. Deactivation of the attribute classifiers not in use can conserve processing resources and battery power. Because using deep learning attribute classifiers consumes a relatively high amount of resources, the techniques described herein also improve performance associated with video analysis. Additionally, the features, functions, and advantages that have been described can be achieved independently in various implementations or may be combined in yet other implementations, further details of which are disclosed with reference to the following description and drawings.

FIG. 1 is a diagram of a system 100 that is operable to modify activation of attribute classifiers and generate attribute classifiers for image classification. The system 100 includes a controller 102, a memory 104 coupled to the controller 102, a camera 106 coupled to the controller 102, and a server 108 accessible by the controller 102. The memory 104 is a non-transitory computer-readable storage device that includes instructions 110. The instructions 110 are executable by the controller 102 to perform the operations described herein.

The camera 106 is configured to capture video 116. The video 116 includes a set of image frames 120 that are captured by the camera 106. For example, the video 116 includes an image frame 120A, an image frame 120B, an image frame 120C, an image frame 120D, an image frame 120E, and an image frame 120F. In FIG. 1, the image frames 120 are sequentially captured by the camera 106 to generate the video 116. For example, the image frame 120B is captured after the image frame 120A, the image frame 120C is captured after the image frame 120B, etc. A first type of object 132, a second type of object 134, and a third type of object 136 are in the image frame 120A. In the example of FIG. 1, the first type of object 132 is a plane, the second type of object 134 is car, and the third type of object 136 is a person. It should be understood that types of objects illustrated in FIG. 1 are merely illustrative and should not be construed as limiting. The first type of object 132 is in each of the image frames 120 and the second type of the object 134 is in the image frames 120A, 120B, 120C, and 120E.

According to one implementation, the captured video 116 can correspond to live video 116A captured by the camera 106. According to this implementation, the controller 102 is configured to perform object detection and attribute classification operations based on the live video 116A, as described in greater detail below. According to another implementation the captured video 116 can correspond to video 116B stored at the server 108. For example, the server 108 stores the video 116B and video 118. The video 118 can include a different set of image frames captured by the camera 106 (or another camera). According to this implementation, the controller 102 is configured to perform object detection and attribute classification operations based on one or both of the stored videos 116B, 118.

The controller 102 includes a video analysis system 112. The video analysis system 112 includes different sets of object detectors and different sets of attribute classifiers that are operable to determine attributes (e.g., characteristics) of the different types of objects 132-136 detected in the image frames 120. The video analysis system 112 is configured to modify activation (e.g., "deployment") of the different sets of attribute classifiers based on statistics of the types of objects 132-136 detected in the image frames 120. For example, the video analysis system 112 can modify activation of different sets of attribute classifiers based on occurrence rates of different types of objects 132-136 in the image frames 120, detection of confidence values of different types of objects 132-136 in the image frames, etc. The operations of the video analysis system 112 are described in greater detail with respect to FIGS. 2-5.

Figure 2:
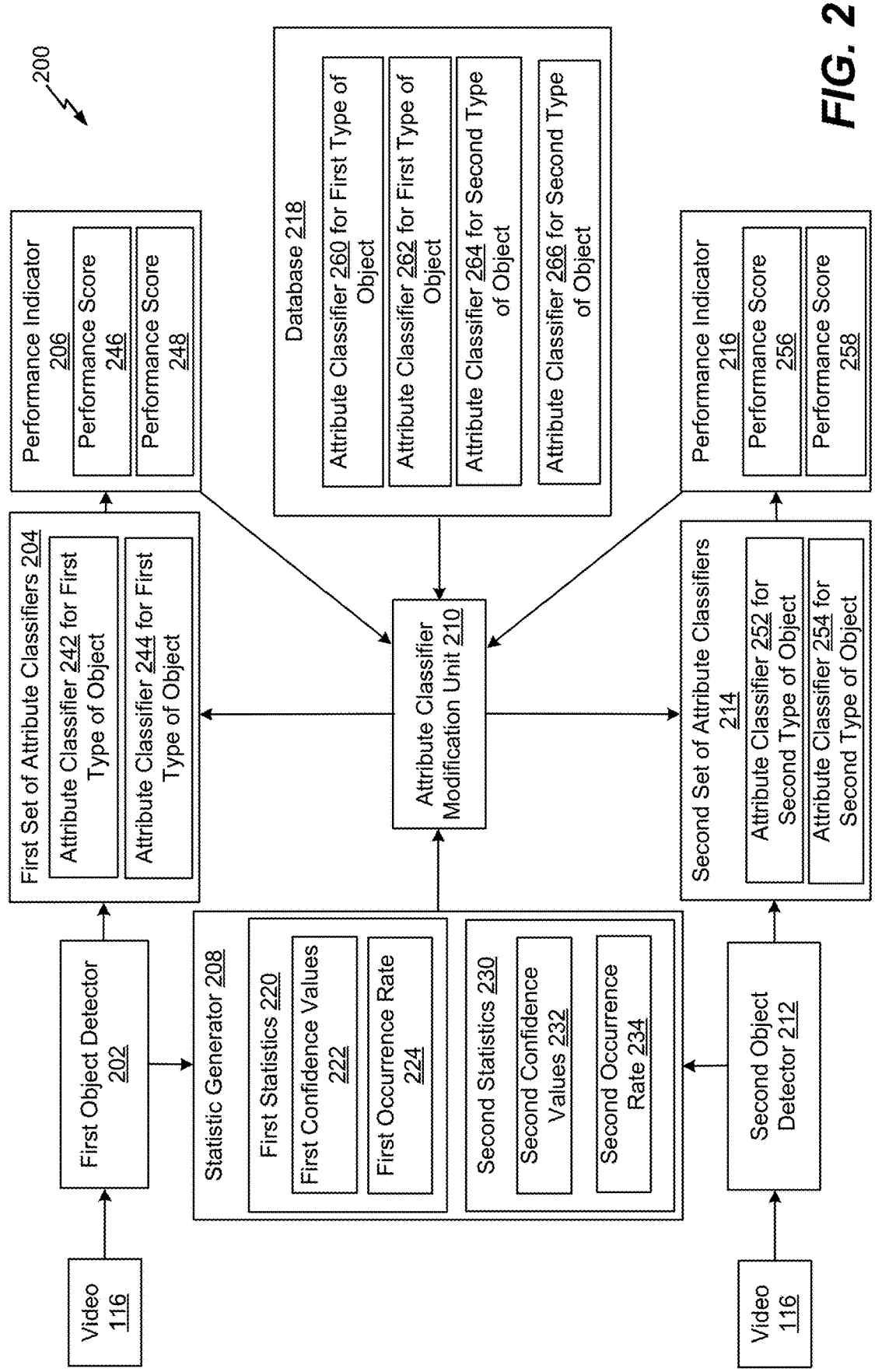
FIG. 2 is a diagram of a system that is operable to modify activation of different sets of attribute classifiers based on object detection statistics.

FIG. 2 is a diagram of a system 200 that is operable to modify activation of different sets of attribute classifiers based on object detection statistics. The system 200 can be included in the video analysis system 112 of FIG. 1. The system 200 includes a first object detector 202, a first set of attribute classifiers 204, a performance indicator 206, a statistic generator 208, an attribute classifier modification unit 210, a second object detector 212, a second set of attribute classifiers 214, and a performance indicator 216.

The video 116 is provided to the first object detector 202 and to the second object detector 212. The controller 102 is configured to activate (e.g., "deploy") the first object detector 202 and the second object detector 212 to detect different types of objects 132, 134, respectively, in the video 116. For example, the first object detector 202 is operable to detect the first type of object 132 in the set of image frames 120 associated with the captured video 116, and the second object detector 212 is operable to detect the second type of object 134 in the set of image frames 120 associated with the captured video 116. To illustrate, the first object detector 202 detects planes in the image frames 120, and the second object detector 212 detects cars in the image frames 120. Object detection operations can be performed at the camera 106 or at a video management system (VMS), such as a VMS server or the controller 102.

Although not illustrated in FIG. 2, in response to detecting one or more objects of the first type of object 132 in the image frames 120 at the first object detector 202, the controller 102 generates one or more bounding boxes around the one or more objects 132. The content (e.g., the first type of object 132) within the one or more bounding boxes is provided to the first set of attribute classifiers 204. In a similar manner, in response to detecting one or more objects of the second type of object 134 in the image frames 120 at the second object detector 212, the controller 102 generates one or more bounding boxes around the one or more objects 134. The content (e.g., the second type of object 134) within the one or more bounding boxes is provided to the second set of attribute classifiers 204.

The first set of attribute classifiers 204 is operable to determine different attributes of objects detected by the first object detector 202. For example, the first set of attribute classifiers 204 includes an attribute classifier 242 and an attribute classifier 244. According to one non-limiting implementation, the attribute classifier 242 can be a color classifier that is operable to determine a color of the first type of object 132 (e.g., the plane) and the attribute classifier 244 can be an airplane type classifier that is operable to determine the airplane type of the first type of object 132. It should be understood that color and airplane type are merely non-limiting examples of attributes determinable by attribute classifiers. The techniques described herein are applicable to any attribute determinable by an attribute classifier. Non-limiting examples of other attributes determinable by attribute classifiers can include number of windows, number of wheels, brightness, contrast, presence of anomalies, etc. In response to the first object detector 202 detecting the first type of object 132 in the image frames 120, the controller 102 is operable to activate the first set of attribute classifiers 204 to determine attributes of the first type of object 132.

The second set of attribute classifiers 214 is operable to determine different attributes of objects detected by the second object detector 212. For example, the second set of attribute classifiers 214 includes an attribute classifier 252 and an attribute classifier 254. According to one non-limiting implementation, the attribute classifier 252 can be a color classifier that is operable to determine a color of the second type of object 134 (e.g., the car) and the attribute classifier 254 can be a model classifier that is operable to determine a model type of the second type of object 134. It should be understood that color and model type are merely non-limiting examples of attributes determinable by attribute classifiers. The techniques described herein are applicable to any attribute determinable by an attribute classifier. In response to the second object detector 212 detecting the second type of object 134 in the image frames 120, the controller 102 is operable to activate the second set of attribute classifiers 214 to determine attributes of the second type of object 134.

The statistic generator 208 is configured to generate first statistics 220 for the first object detector 202 and second statistics 230 for the second object detector 212. The first statistics 220 include first confidence values 222 and a first occurrence rate 224. The first confidence values 222 indicate a confidence level that an object detected by the first object detector 202 is the first type of object 132. For example, in certain scenarios, the first object detector 202 can generate a false positive. To illustrate, the first object detector 202 can detect a helicopter in one of the image frames 120 and generate data to indicate that the helicopter is a plane. In this scenario, the confidence level (e.g., the confidence values 222) is lower than the confidence level that results from the first object detector 202 detecting a commercial airliner in one of the image frames 120. The first occurrence rate 224 indicates a rate that the first type of object 132 is detected in the image frames 120. For example, if the first type of object 132 is detected in each image frame 120 that is analyzed, the first occurrence rate 224 would be one-hundred percent. However, if the first type of object 132 is detected in half of the image frames 120 that are analyzed, the first occurrence rate would be fifty percent. The second statistics 230 include second confidence values 232 and a second occurrence rate 234. The second confidence values 232 indicate a confidence level that an object detected by the second object detector 212 is the second type of object 134. The second occurrence rate 234 indicates a rate that the second type of object 134 is detected in the image frames 120. The first statistics 220 and the second statistics 230 are provided to the attribute classifier modification unit 210.

The attribute classifier modification unit 210 compares the first statistics 220 and the second statistics 230 to determine how to modify activation (e.g., deployment) of each set of attribute classifiers 204, 214. As a non-limiting example, based on the comparison, the attribute classifier modification unit 210 can determine that the first type of object 132 has a higher occurrence rate in the set of image frames 120 than the second type of object 134. The attribute classifier modification unit 210 is operable to deactivate attribute classifiers 252, 254 in the second set of attribute classifiers 214 in response to a determination that the first type of object 132 has a higher occurrence rate than the second type of object 134. For example, the attribute classifier modification unit 210 can generate a deactivation signal and provide the deactivation signal to one or more of the attribute classifiers 252, 254 to deactivate one or more of the attribute classifiers 252, 254. Deactivating one or more of the attribute classifiers 252, 254 reduces power consumption associated with attribute classifiers 252, 254 that are less frequently used. For example, because the first occurrence rate 224 is higher than the second occurrence rate 234, the attribute classifier modification unit 210 determines that the second type of object 134 occurs less frequently than the first type of object 132, and thus the second set of attribute classifiers 214 is used less frequently than the first set of attribute classifiers 204. The statistic generator 208 and the attribute classifier modification unit 210 can run at a fraction of the rate as the attribute classifiers 204, 214. As a non-limiting example, the statistic generator 208 and the attribute classifier modification unit 210 can run at one frame per second (fps) to gather and analyze the statistics 220, 230, and the attribute classifiers 204, 214 can determine attributes at a rate of fifteen fps (e.g., a full frame rate).

A database 218 includes additional attribute classifiers 260-266 that can be deployed (e.g., activated) for use. Each attribute classifier 260-266 can be trained to determine characteristics of a particular type of object. As a non-limiting example, the attribute classifier 260 can be trained to determine a number of windows that appear in the first type of object 132, the attribute classifier 262 can be trained to determine a model type of the first type of object 132, the attribute classifier 264 can be trained to determine a number of wheels that appear in the second type of object 134, and the attribute classifier 266 can be trained to determine a height of the second type of object 134. The attribute classifier modification unit 210 can deploy an additional attribute classifier 260, 262 (trained to determine a characteristic of the first type of object 132) for activation in response to a determination that the first type of object 132 has a higher occurrence rate than the second type of object 134. For example, the attribute classifier modification unit 210 can retrieve the attribute classifier 260, the attribute classifier 262, or both, from the database 218 and add the one or more attribute classifiers 260, 262 to the first set of attribute classifiers 204. Adding the attribute classifiers 260, 262 to the first set of attribute classifiers 204 and activating the additional attribute classifiers 260, 262 can enhance classification of objects that frequently appear in the image frames 120.

The performance indicator 206 is operable to determine a performance score 246 for the attribute classifier 242 and a performance score 248 for the attribute classifier 244. Different attribute classifiers 242, 244 can perform differently based on external factors such as a time of day, a weather condition, a location, or a combination thereof. As a non-limiting example, the attribute classifier 242 can be a color attribute classifier that is operable to determine a color of the first type of object 132. If the time of day is between 7:00 am and 7:00 pm, the attribute classifier 242 can perform effectively because there is usually natural light (e.g., sunlight) that enables the attribute classifier 242 to differentiate between different colors. However, if the time of day is between 7:00 pm and 7:00 am, performance of the attribute classifier 242 may be degraded due to the lack of natural light. The performance scores 246, 248 indicate how effectively the corresponding attribute classifiers 242, 244 perform. As a non-limiting example, if the attribute classifier 242 has a performance score 246 of ten, the attribute classifier modification unit 210 can determine the attribute classifier 242 has good performance. As another non-limiting example, if the attribute classifier 244 has a performance score 248 of one, the attribute classifier modification unit 210 can determine the attribute classifier 244 has poor performance. Thus, the performance scores indicate how well a corresponding attribute classifier performs. In a similar manner, the performance indicator 216 is operable to determine a performance score 256 for the attribute classifier 252 and a performance score 258 for the attribute classifier 254. The performance scores are provided to the attribute classifier modification unit 210.

The attribute classifier modification unit 210 compares each performance score to a performance score threshold. The attribute classifier modification unit 210 deactivates attribute classifiers that have performance scores that fail to satisfy (e.g., are less than) the performance score threshold. As a non-limiting example, if the performance score 248 fails to satisfy the performance score threshold, the attribute classifier modification unit 210 deactivates the attribute classifier 244 to reduce the use of processing resources (e.g., the attribute classifier 244) that have relatively low or sub-par performance. Additionally, if multiple attribute classifiers have different performance scores but determine similar attributes, such as color, the attribute classifier modification unit 210 deactivates the attribute classifier that has the lowest performance score. For example, the attribute classifier modification unit 210 activates the attribute classifier that indicates a higher level of performance based on current conditions (e.g., weather, time of day, location, etc.) and deactivates the attribute classifiers that indicate a lower level of performance based on the current conditions.

The system 200 of FIG. 2 dynamically modifies deployment (e.g., activation) of attribute classifiers based on object detection statistics 220, 230 and performance data associated with the attribute classifiers. For example, the system 200 deploys attribute classifiers 242, 244 that are trained to determine characteristics of the first type of object 132 in response to the first statistics 220 indicating that the first type of object 132 is in the video 116. Additionally, the system 200 deactivates attribute classifiers 252, 254 that are trained to determine characteristics of other types of objects to conserve battery and processing resources.

Figure 3:
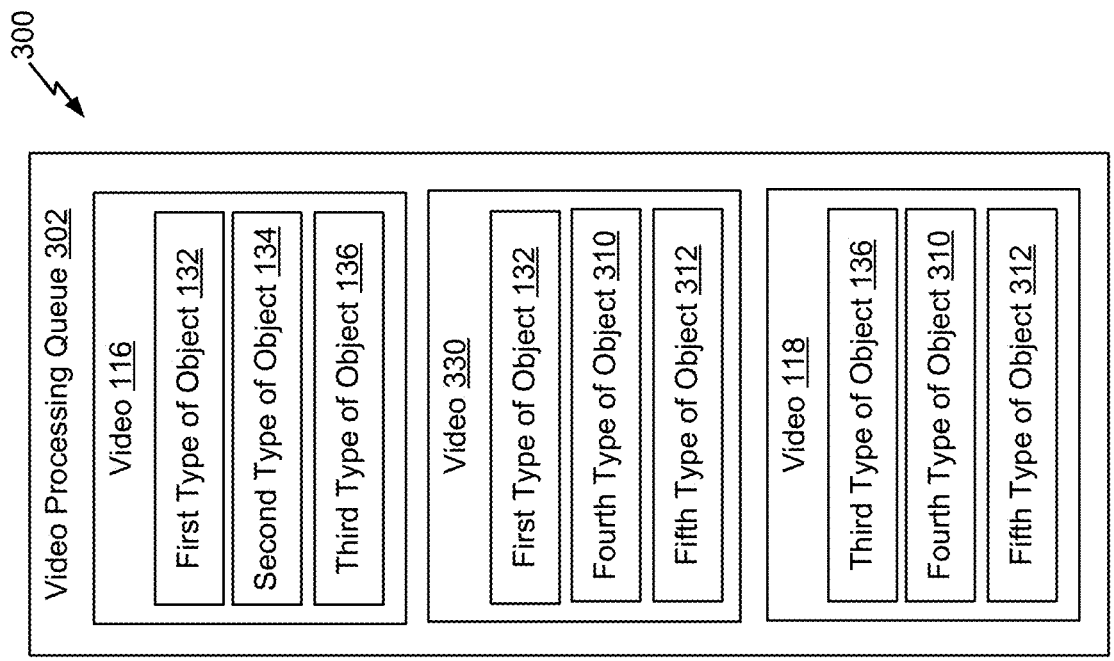
FIG. 3 is a diagram of a process for reordering video in a video processing queue.
Figure 3:
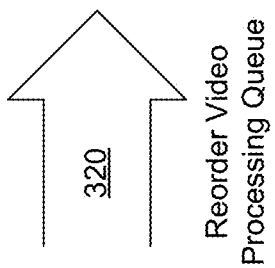
Figure 3:
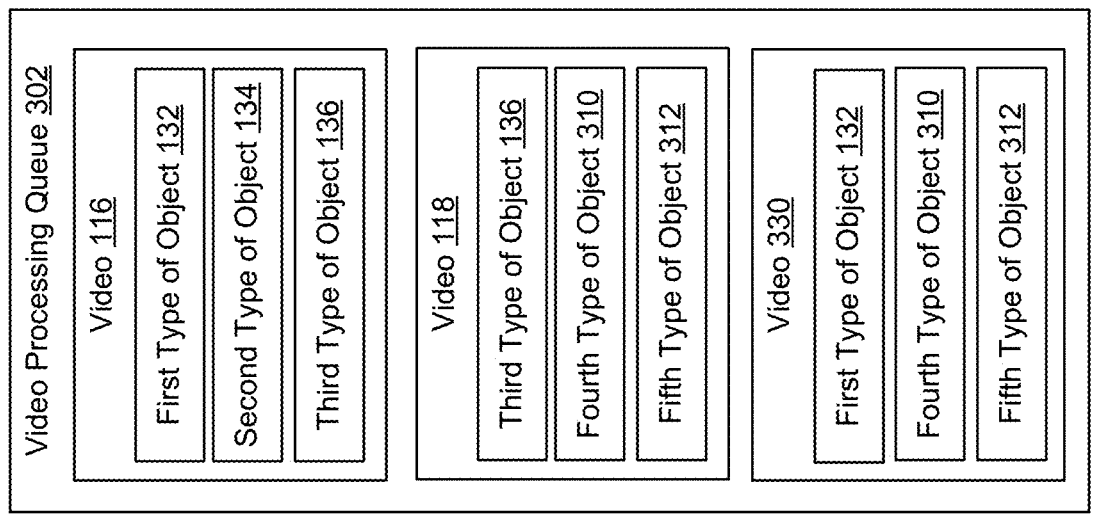

FIG. 3 is a diagram illustrating a process 300 for reordering video in a video processing queue. The process 300 can be performed by the controller 102, the system 200, or both.

In FIG. 3, a video processing queue 302 is shown. According to one implementation, the video processing queue 302 can be included in the memory 104, the server 108, or another device that is accessible to the controller 102. The video processing queue 302 includes the video 116, the video 118, and a video 330. As illustrated in FIG. 1, the video 116 includes the first type of object 132, the second type of object 134, and the third type of object 136. The video 118 includes the third type of object 136, a fourth type of object 310, and a fifth type of object 312. The video 330 includes the first type of object 132, the fourth type of object 310, and the fifth type of object 312.

The videos 116, 118, 330 are stored in the video processing queue 302 according to a processing order. For example, the video 116 is processed prior to the videos 118, 330, and the video 118 is processed prior to the video 330. According to some implementations, the controller 102 can perform a reorder operation 320 to reorder the videos in the video processing queue 302 to sequentially process videos that are anticipated to use the same attribute classifiers. As a non-limiting example, in response to the determination that the first type of object 132 is detected, the controller 102 reorders the videos in the video processing queue 302 such that the videos 116, 330 including the first type of object 132 are processed together (e.g., sequentially or in parallel). In the example of FIG. 3, the video 330 and video 118 are rearranged in the video processing queue 302 such that the video 116 is processed prior to the videos 118, 330, and the video 330 is processed prior to the video 118.

Thus, in response to the determination that the first type of object 132 has a higher occurrence rate than the second type of object 134, the controller 102 can use the video processing queue 302 to retrieve additional video 330 that includes the first type of object 132. The controller 102 can perform object detection on the additional video 330 with the first object detector 202 and can perform attribute classification on objects detected in the additional video 330 with the first set of attribute classifiers 204. Thus, in scenarios where processing resources are limited, the controller 102 can reorder the video processing queue 302 to process videos 116, 330 that utilize the same set of attribute classifiers 204.

Figure 4:
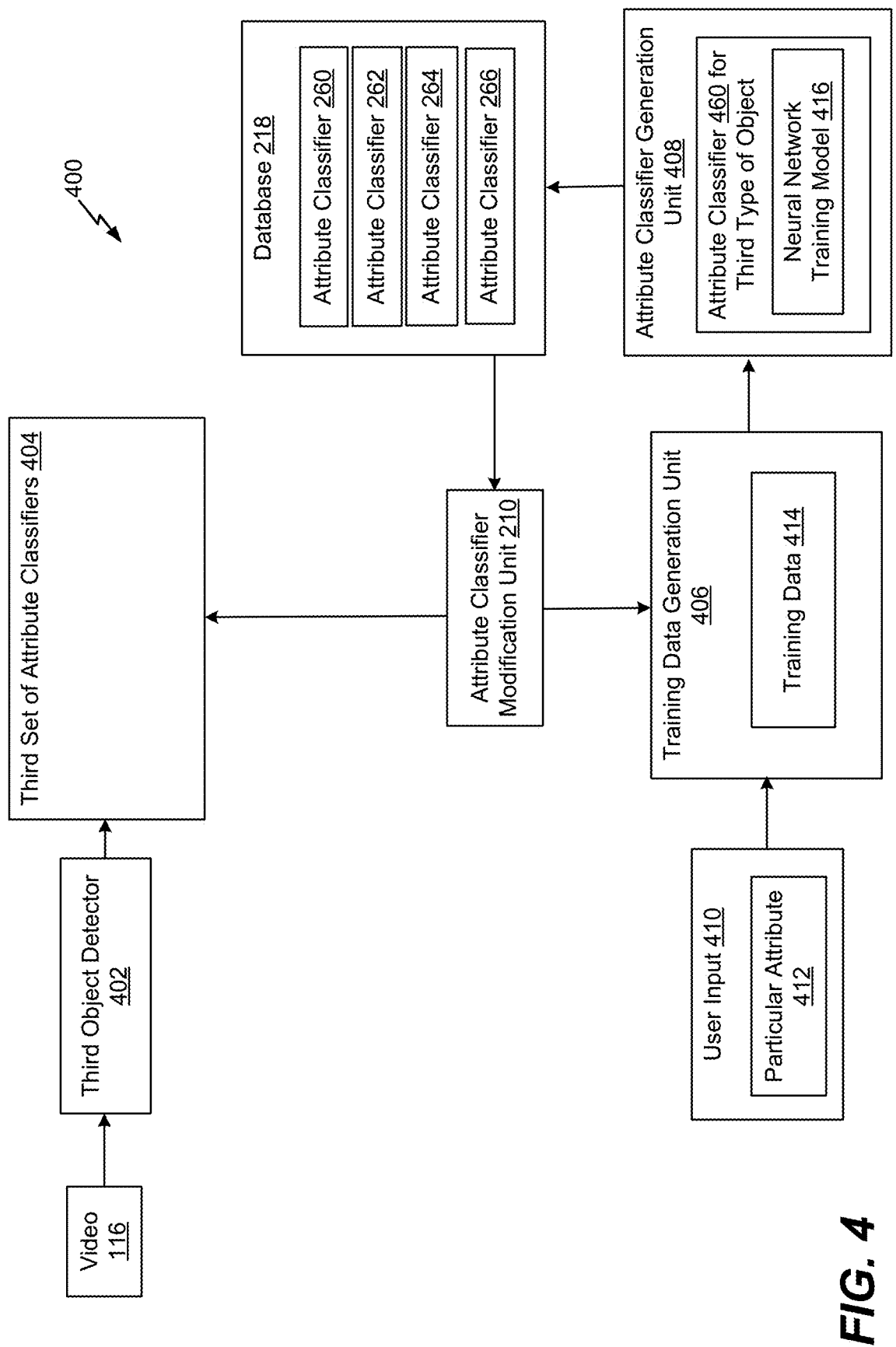
FIG. 4 is a diagram of a system that is operable to generate a particular attribute classifier for a particular type of object in response to a determination that there are no available attribute classifiers for the particular type of object.

FIG. 4 is a diagram of a system 400 that is operable to generate a particular attribute classifier for a particular type of object in response to a determination that there are no available attribute classifiers for the particular type of object. The system 400 can be included in the video analysis system 112 of FIG. 1. According to one implementation, the system 400 is integrated in conjunction with the system 200. The system 400 includes a third object detector 402 configured to detect a third type of object 136, a third set of attribute classifiers 404, the attribute classifier modification unit 210, a training data generation unit 406, an attribute classifier generation unit 408, and the database 218. According to one implementation, the third object detector 402 can be substantially identical to the first object detector 202 or the second object detector 212.

The video 116 is provided to the third object detector 402. The controller 102 is configured to activate (e.g., "deploy") the third object detector 402 to detect the third type of object 136 in the video 116. For example, the third object detector 402 is operable to detect the third type of object 136 in the set of image frames 120 associated with the captured video 116. To illustrate, the third object detector 402 detects people in the image frames 120. Although not illustrated in FIG. 4, in response to detecting the third type of object 136 in the image frames 120 at the third object detector 402, the controller 102 generates one or more bounding boxes around the detected objects. The content (e.g., the third type of object 136) within the one or more bounding boxes is provided to the third set of attribute classifiers 404.

The attribute classifier modification unit 210 determines that there are no available attribute classifiers that are operable to determine attributes of the third type of object 136 detected by the third object detector 402. For example, the attribute classifier modification unit 210 can determine that there are no attribute classifiers (in the third set of attribute classifiers 404 or in the database 218) operable to determine attributes of a person. Alternatively, the attribute modification unit 210 can determine that some attribute classifiers are available, such as an attribute classifier for clothing color, but a user-requested attribute classifier is not available. For example, the attribute modification unit 210 can determine that an attribute for detecting a presence of a backpack (on a person) is not available.

In response to the determination that there are no available attribute classifiers for the third type of object 136, a user input 410 is provided to the training data generation unit 406. For example, the system 400 prompts a user for one or more desired attributes. The user input 410 indicates a particular attribute 412 of the third type of object 136 to be determined by an attribute classifier 460. As a non-limiting example, the particular attribute 412 could include an estimated age of the person (e.g., the third type of object 136), a hairstyle of the person, etc. According to another implementation, the particular attribute 412 can include a color attribute, a shape attribute, etc.

The training data generation unit 406 generates training data 414 and the attribute classifier generation unit 408 generates a new attribute classifier 460 for the particular attribute 412 based on the user input 410. For example, the training data generation unit 406 collects training sets associated with the particular attribute 412 and uses an annotation service to annotate training data 414 associated with the training sets. Based on the annotated training data 414 and using deep learning as a service (DLAAS), the attribute classifier generation unit 408 generates the attribute classifier 460. According to one implementation, the attribute classifier 460 includes a neural network data 416. In the example of FIG. 4, the attribute classifier 460 is for the third type of object 136 based on the training data 414. For example, the attribute classifier 460 is operable to determine the particular attribute 412 for the third type of object 136.

Figure 5:
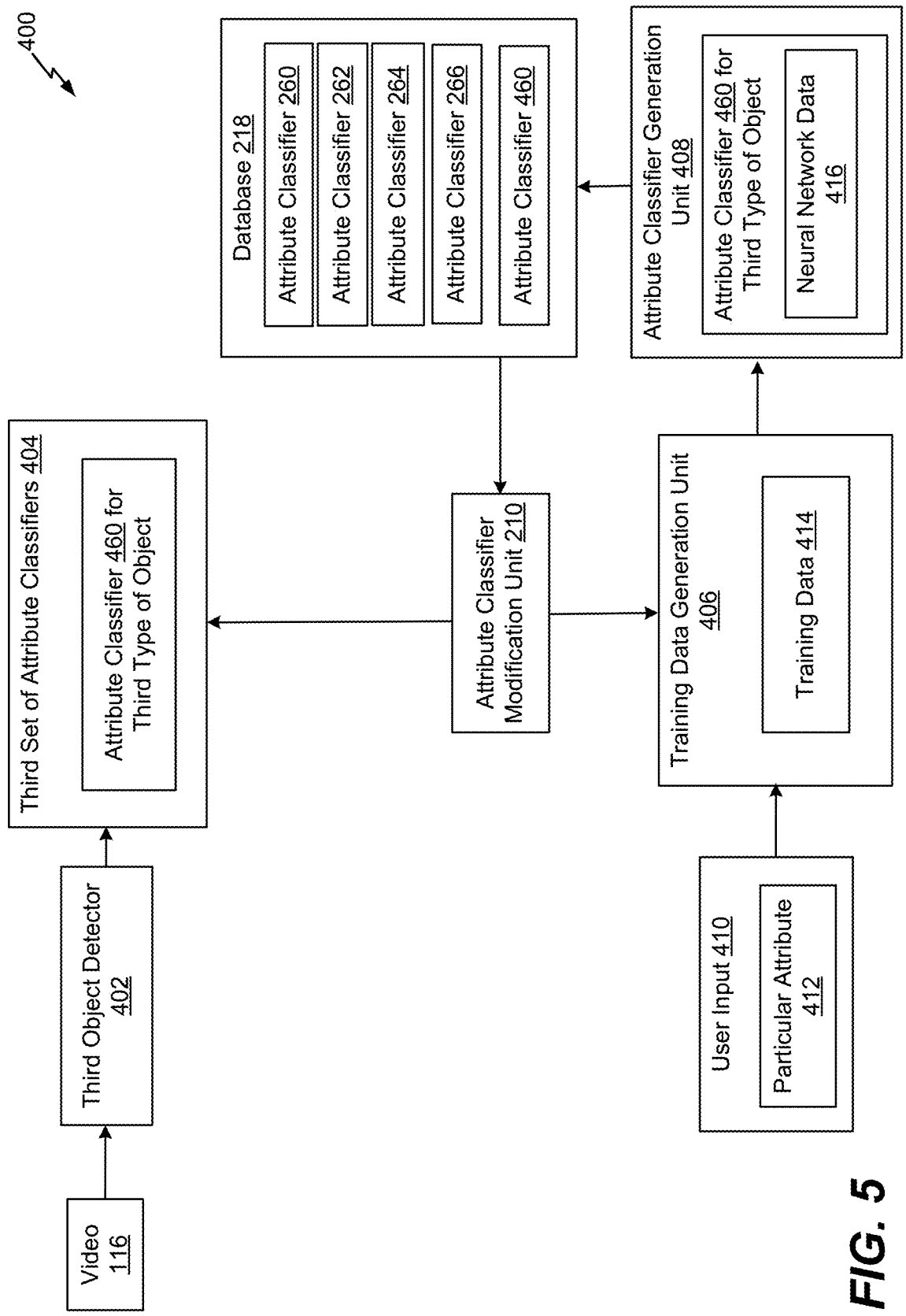
FIG. 5 is an illustrative example of a system for deploying a newly generated attribute classifier.

FIG. 5 is an illustrative example of the system 400 of FIG. 4 after deploying the newly generated attribute classifier. For example, in FIG. 5, the attribute classifier generation unit 408 stores the attribute classifier 460 for the third type of object 136 in the database 218. The attribute classifier modification unit 210 deploys the attribute classifier 460 (trained to determine the particular attribute 412 of the third type of object 136) for activation. For example, the attribute classifier modification unit 210 can retrieve the attribute classifier 460 from the database 218 and add the attribute classifier 460 to the third set of attribute classifiers 404. Adding the attribute classifier 460 to the third set of attribute classifiers 404 and activating the attribute classifier 460 enables the system 400 to determine the particular attribute 412 of the third type of object 136.

Figure 6:
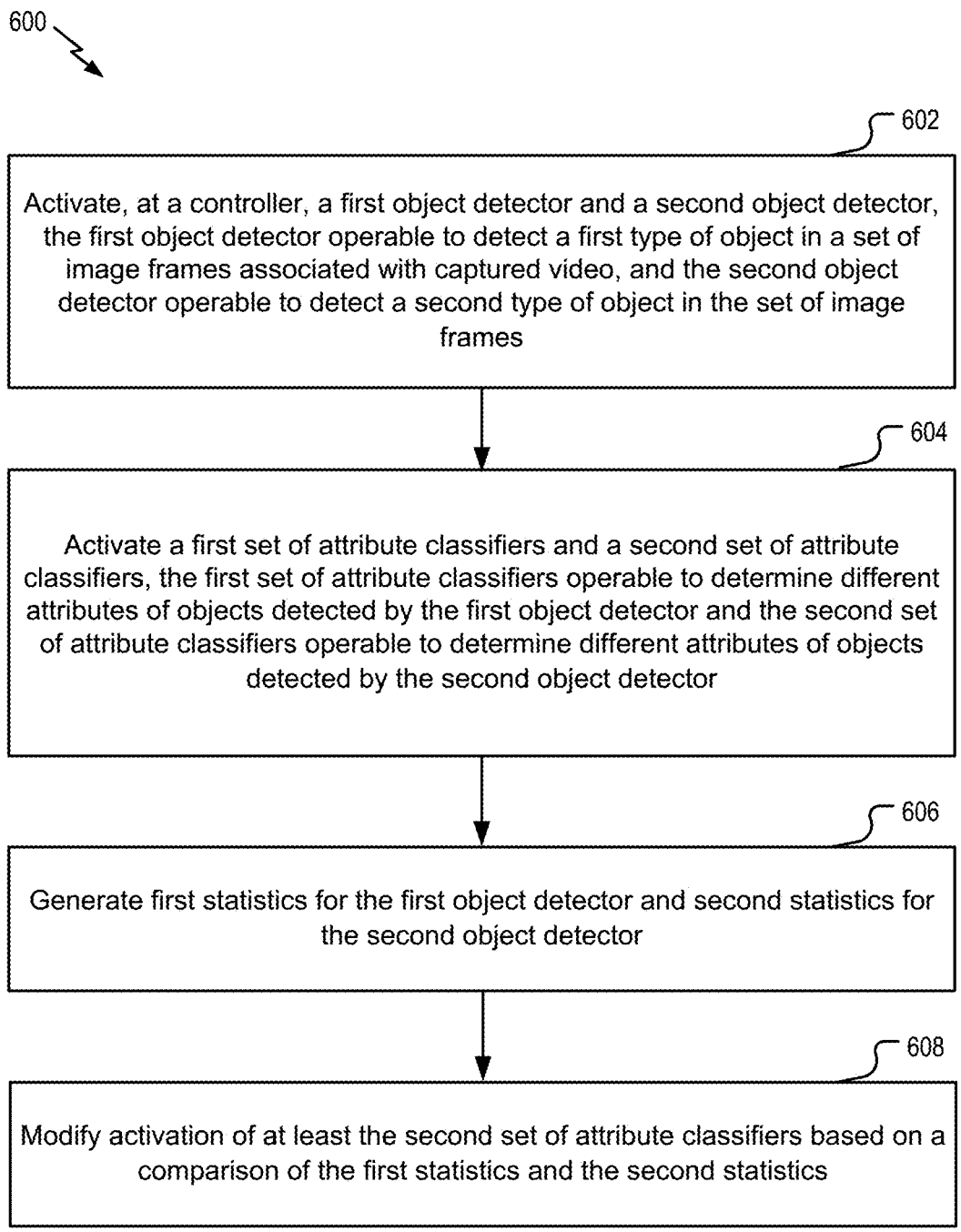
FIG. 6 is a flowchart of a method for image classification.

FIG. 6 is a flowchart of a method 600 for image classification. The method 600 can be performed by the controller 102, the system 200, or both.

The method 600 includes activating, at a controller, a first object detector and a second object detector, at 602. The first object detector is operable to detect a first type of object in a set of image frames associated with captured video, and the second object detector is operable to detect a second type of object in the set of image frames. For example, the controller 102 activates (e.g., "deploys") the first object detector 202 and the second object detector 212 to detect different types of objects 132, 134, respectively, in the video 116. The first object detector 202 detects the first type of object 132 in the set of image frames 120 associated with the captured video 116, and the second object detector 212 detects the second type of object 134 in the set of image frames 120 associated with the captured video 116. To illustrate, the first object detector 202 detects planes in the image frames 120, and the second object detector 212 detects cars in the image frames 120. Object detection operations can be performed at the camera 106, at a VMS server, or at the controller 102.

The method 600 also includes activating a first set of attribute classifiers and a second set of attribute classifiers, at 604. The first set of attribute classifiers is operable to determine different attributes of objects detected by the first object detector and the second set of attribute classifiers is operable to determine different attributes of objects detected by the second object detector. For example, the controller 102 initially activates the first set of attribute classifiers 204 to determine attributes of the first type of object 132 and activates the second set of attribute classifiers 214 to determine attributes of the second type of object 134.

The method 600 also includes generating first statistics for the first object detector and second statistics for the second object detector, at 606. For example, the statistics generator 208 generates the first statistics 220 for the first object detector 202 and the second statistics 230 for the second object detector 212. The statistics 220, 230 include confidence values 222, 232 and occurrence rates 224, 234.

The method 600 also includes modifying activation of at least the second set of attribute classifiers based on a comparison of the first statistics and the second statistics, at 608. For example, the attribute classifier modification unit 210 compares the first statistics 220 and the second statistics 230 to determine how to modify activation (e.g., deployment) of each set of attribute classifiers 204, 214. As a non-limiting example, based on the comparison, the attribute classifier modification unit 210 can determine that the first type of object 132 has a higher occurrence rate in the set of image frames 120 than the second type of object 134. In an illustrative example, the attribute classifier modification unit 210 deactivates the attribute classifiers 252, 254 in the second set of attribute classifiers 214 in response to a determination that the first type of object 132 has a higher occurrence rate than the second type of object 134. Deactivating one or more of the attribute classifiers 252, 254 reduces power consumption associated with attribute classifiers 252, 254 that are less frequently used. For example, because the first occurrence rate 224 is higher than the second occurrence rate 234, the attribute classifier modification unit 210 determines that the second type of object 134 occurs less frequently than the first type of object 132, and thus the second set of attribute classifiers 214 is used less frequently than the first set of attribute classifiers 204. Additionally, the attribute classifier modification unit 210 can deploy an additional attribute classifier 260, 262 (trained to determine a characteristic of the first type of object 132) for activation in response to a determination that the first type of object 132 has a higher occurrence rate than the second type of object 134. For example, the attribute classifier modification unit 210 can retrieve the attribute classifier 260, the attribute classifier 262, or both, from the database 218 and add the one or more attribute classifiers 260, 262 to the first set of attribute classifiers 204. Adding the attribute classifiers 260, 262 to the first set of attribute classifiers 204 and activating the additional attribute classifiers 260, 262 can enhance classification of objects that frequently appear in the image frames 120.

The method 600 enables dynamic modification of deployment (e.g., activation) of attribute classifiers based on object detection statistics 220, 230 and performance data associated with the attribute classifiers. For example, the method 600 enables deployment of attribute classifiers 242, 244 that are trained to determine characteristics of the first type of object 132 in response to the first statistics 220 indicating that the first type of object 132 is in the video 116. Additionally, the method 600 enables deactivation of attribute classifiers 252, 254 that are trained to determine characteristics of other types of objects to conserve battery and processing resources.

Figure 7:
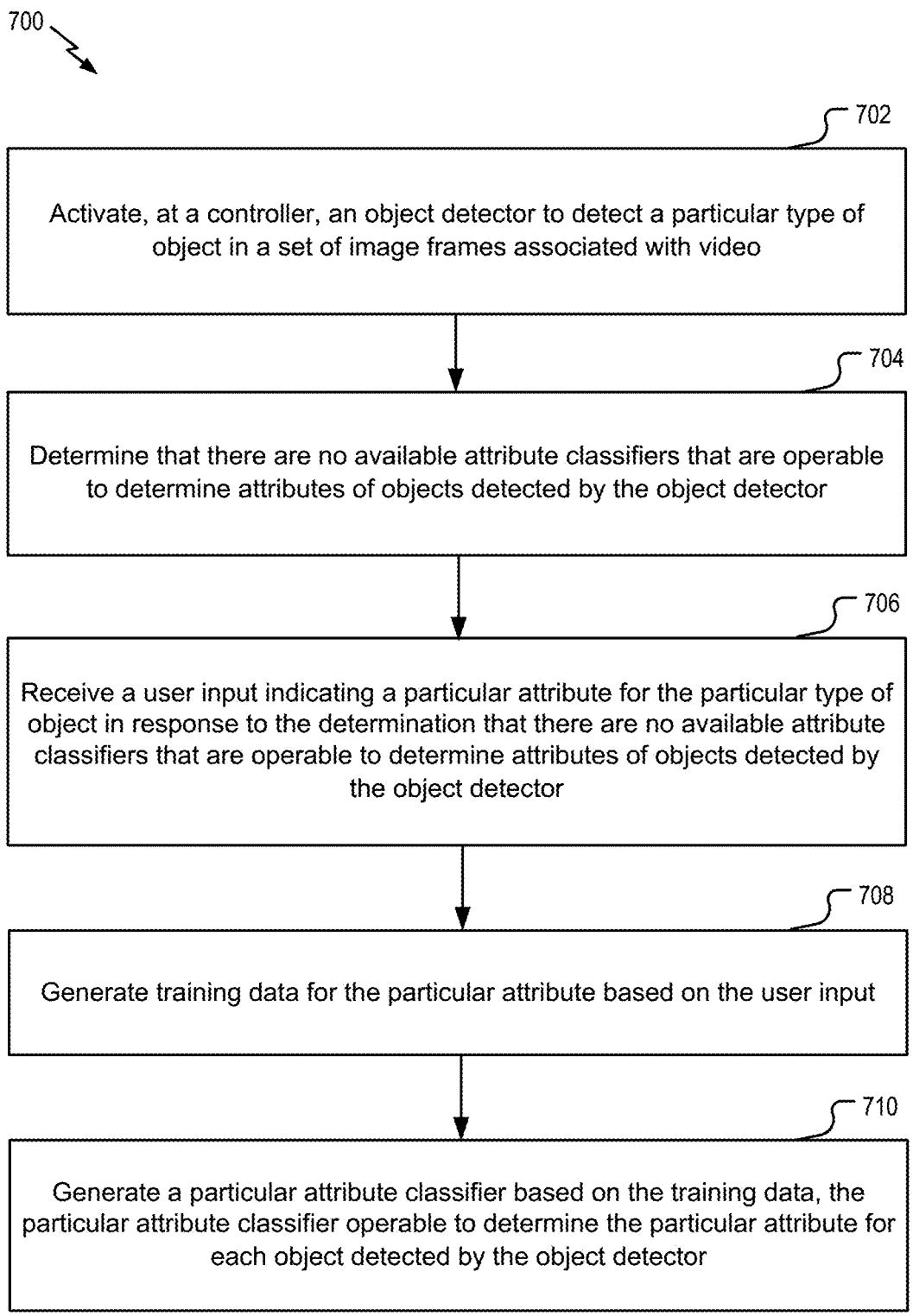
FIG. 7 is a flowchart of another method for image classification.

FIG. 7 is a flowchart of another method 700 for image classification. The method 700 can be performed by the controller 102, the system 200, the system 400, or a combination thereof.

The method 700 includes activating, at a controller, an object detector to detect a particular type of object in a set of image frames associated with video, at 702. For example, the controller 102 activates (e.g., "deploys") the third object detector 402 to detect the third type of object 136 in the video 116. To illustrate, the third object detector 402 is operable to detect the third type of object 136 in the set of image frames 120 associated with the captured video 116.

The method 700 also includes determining that there are no available attribute classifiers that are operable to determine attributes of objects detected by the object detector, at 704. For example, referring to FIG. 4, the attribute classifier modification unit 210 determines that there are no available attribute classifiers that are operable to determine attributes of the third type of object 136 detected by the third object detector 402. To illustrate, the attribute classifier modification unit 210 can determine that there are no attribute classifiers (in the third set of attribute classifiers 404 or in the database 218) operable to determine attributes of a person (e.g., the third type of object 136).

The method 700 also includes receiving a user input indicating a particular attribute for the particular type of object in response to the determination that there are no available attribute classifiers that are operable to determine attributes of objects detected by the object detector, at 706. For example, the system 400 prompts a user for one or more desired attributes. The user input 410 indicates the particular attribute 412 of the third type of object 136 to be determined by an attribute classifier 460.

The method 700 also includes generating training data for the particular attribute based on the user input, at 708. For example, the training data generation unit 406 generates the training data 414 for the particular attribute 412 based on the user input 410. To illustrate, the training data generation unit 406 collects training sets associated with the particular attribute 412 and uses an annotation service to annotate training data associated with the training sets. Based on the annotated training data 414 and using DLAAS, the attribute classifier generation unit 408 generates the attribute classifier 460. According to one implementation, the attribute classifier 460 includes the neural network data 416. In the example of FIG. 4, the attribute classifier 460 is for the third type of object 136 based on the training data 414. For example, the attribute classifier 460 is operable to determine the particular attribute 412 for the third type of object 136.

The method 700 further includes generating a particular attribute classifier based on the training data, at 710. The particular attribute classifier is operable to determine the particular attribute for each object detected by the object detector. For example, in FIG. 5, the attribute classifier generation unit 408 stores the attribute classifier 460 for the third type of object 136 in the database 218. The attribute classifier modification unit 210 deploys attribute classifier 460 (trained to determine the particular attribute 412 of the third type of object 136) for activation. For example, the attribute classifier modification unit 210 can retrieve the attribute classifier 460 from the database 218 and add the attribute classifier 460 to the third set of attribute classifiers 404. Adding the attribute classifier 460 to the third set of attribute classifiers 404 and activating the attribute classifier 460 enables the system 400 to determine the particular attribute 412 of the third type of object 136.

The present invention may be a system, a method, and/or a computer program product at any possible technical detail level of integration. The computer program product may include a computer readable storage medium (or media) having computer readable program instructions thereon for causing a processor (or controller) to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or eight source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other devices to cause a series of operational steps to be performed on the computer, other programmable apparatus or other devices to produce a computer implemented process, such that the instructions which execute on the computer, other programmable apparatus, or other devices implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method comprising:
    activating, at a controller, an object detector to detect a particular type of object in a set of image frames associated with video; and
    in response to a determination that there are no available attribute classifiers that are operable to determine attributes of objects detected by the object detector:
        receiving a user input indicating a particular attribute for the particular type of object;
        generating training data for the particular attribute based on the user input; and
        generating a particular attribute classifier based on the training data, the particular attribute classifier operable to determine the particular attribute for each object detected by the object detector.

2. The method of claim 1, wherein the particular attribute is selected from the group consisting of a color attribute, a shape attribute, a size attribute, and a speed attribute.

3. The method of claim 1, further comprising adding the particular attribute to an attribute database.

4. The method of claim 1, further comprising activating the particular attribute classifier to determine the particular attribute for each object detected by the object detector.

* * * * *